(12) United States Patent
Craddock et al.

(10) Patent No.: US 6,834,332 B2
(45) Date of Patent: Dec. 21, 2004

(54) APPARATUS AND METHOD FOR SWAPPING-OUT REAL MEMORY BY INHIBITING I/O OPERATIONS TO A MEMORY REGION AND SETTING A QUIESCENT INDICATOR, RESPONSIVE TO DETERMINING THE CURRENT NUMBER OF OUTSTANDING OPERATIONS

(75) Inventors: David F. Craddock, New Paltz, NY (US); Thomas Anthony Gregg, Highland, NY (US); Renato John Recio, Austin, TX (US); Donald William Schmidt, Stone Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 516 days.

(21) Appl. No.: 09/942,632

(22) Filed: Aug. 30, 2001

(65) Prior Publication Data

US 2003/0046505 A1 Mar. 6, 2003

(51) Int. Cl.[7] .............................................. G06F 13/00
(52) U.S. Cl. ...................... 711/159; 711/156; 711/165; 711/170; 709/229; 709/235; 710/200; 710/220; 710/240
(58) Field of Search ................................ 711/165, 170, 711/156, 159, 114, 166, 163; 709/229, 235; 710/200, 220, 240

(56) References Cited

U.S. PATENT DOCUMENTS 5,640,524 A  *  6/1997  Beard et al. ................. 712/222

* cited by examiner

Primary Examiner—Hong Kim
(74) Attorney, Agent, or Firm—Duke W. Yee; Casimer K. Salys; Stephen J. Walder, Jr.

(57) ABSTRACT

An apparatus and method for swapping out real memory by inhibiting input/output (I/O) operations to a memory region are provided. The apparatus and method provide a mechanism in which a quiesce indicator is provided in a field containing the current outstanding I/O count associated with the memory region whose real memory is to be swapped out. The current I/O field and the quiesce indicator are used as a means for communicating between a shared resource arbitrator and a guest consumer. When the quiesce indicator is set, the guest consumer is informed that it should not send any further I/O operations to that memory region. When the number of pending I/O operations against the memory region is zero, a valid bit in a protection table is set to invalid, and the real memory associated with the memory region may be swapped out. Thereafter, when the memory region is swapped back in, an address translation table is updated, the valid bit is reset, and the quiesce indicator is reset so that further I/O operations to the memory region may occur.

30 Claims, 11 Drawing Sheets

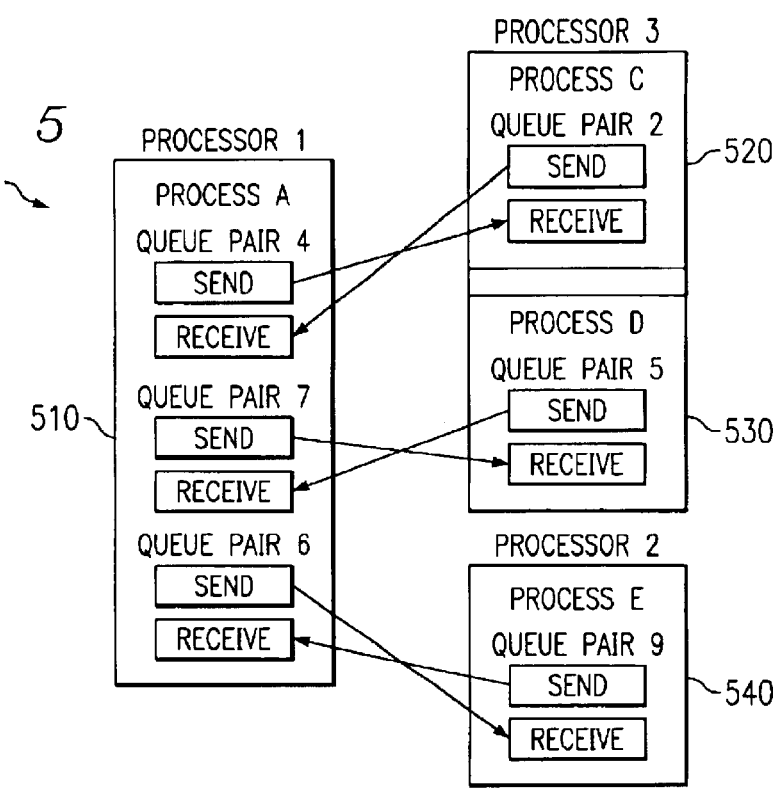
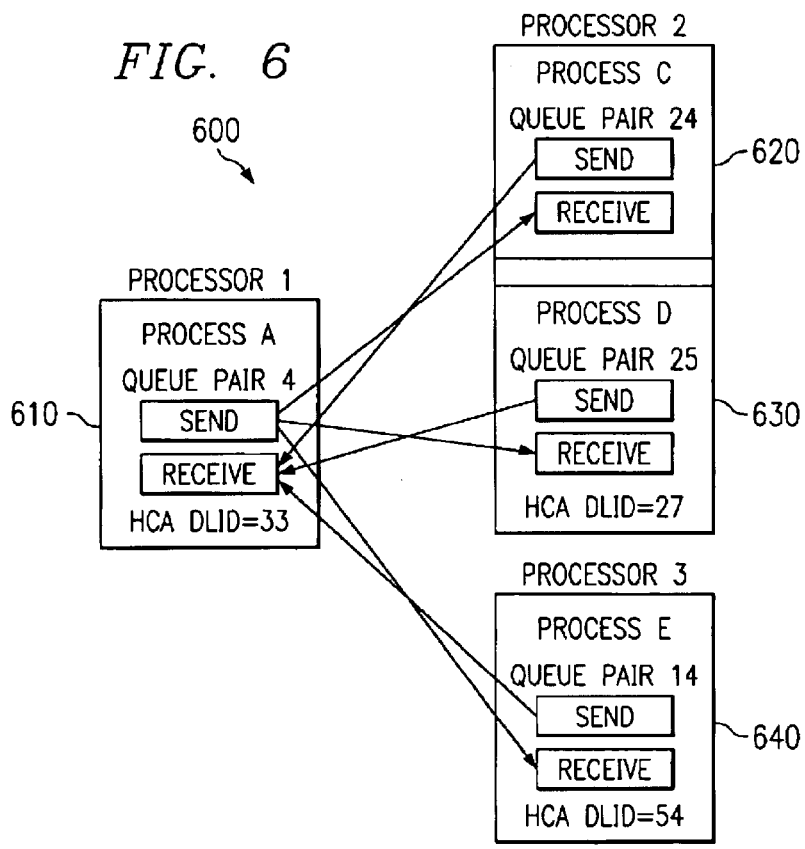

APPARATUS AND METHOD FOR SWAPPING-OUT REAL MEMORY BY INHIBITING I/O OPERATIONS TO A MEMORY REGION AND SETTING A QUIESCENT INDICATOR, RESPONSIVE TO DETERMINING THE CURRENT NUMBER OF OUTSTANDING OPERATIONS

BACKGROUND OF THE INVENTION

1. Technical Field

The present invention is directed to an improved data processing system. More specifically, the present invention provides an apparatus and method for inhibiting input/output (I/O) operations to a memory region so that real memory associated with the memory region may be swapped-out.

2. Description of Related Art

In a System Area Network (SAN), such as an InfiniBand (IB) network, the hardware provides a message passing mechanism that can be used for Input/Output devices (I/O) and interprocess communications (IPC) between general computing nodes. Processes executing on devices access SAN message passing hardware by posting send/receive messages to send/receive work queues on a SAN channel adapter (CA). These processes also are referred to as "consumers."

The send/receive work queues (WQ) are assigned to a consumer as a queue pair (QP). The messages can be sent over five different transport types: Reliable Connected (RC), Reliable Datagram (RD), Unreliable Connected (UC), Unreliable Datagram (UD), and Raw Datagram (RawD). Consumers retrieve the results of these messages from a completion queue (CQ) through SAN send and receive work completion (WC) queues. The source channel adapter takes care of segmenting outbound messages and sending them to the destination. The destination channel adapter takes care of reassembling inbound messages and placing them in the memory space designated by the destination's consumer.

Two channel adapter types are present in nodes of the SAN fabric, a host channel adapter (HCA) and a target channel adapter (TCA). The host channel adapter is used by general purpose computing nodes to access the SAN fabric. Consumers use SAN verbs to access host channel adapter functions. The software that interprets verbs and directly accesses the channel adapter is known as the channel interface (CI).

Target channel adapters (TCA) are used by nodes that are the subject of messages sent from host channel adapters. The target channel adapters serve a similar function as that of the host channel adapters in providing the target node an access point to the SAN fabric.

The SAN described above uses the registration of memory regions to make memory accessible to HCA hardware. Using the verbs defined within the SAN specification, these memory regions must be pinned, i.e. they must remain constant and not be paged out to disk, while the HCA is allowed to access them.

When the memory region is pinned it may not be used by any other application, even if the memory region is not being used by the application that owns it. Thus, it would be beneficial to have an apparatus and method whereby all or part of the memory that makes up a memory region may be re-used by another application during the period it is not being used by the owning application.

SUMMARY OF THE INVENTION

The present invention provides an apparatus and method for swapping out real memory by inhibiting input/output (I/O) operations to a memory region. The apparatus and method provide a mechanism in which a quiesce indicator is provided in a field containing the current outstanding I/O count associated with the memory region whose real memory is to be swapped out. The current I/O field and the quiesce indicator are used as a means for communicating between a shared resource arbitrator and a guest consumer.

When the quiesce indicator is set, the guest consumer is informed that it should not send any further I/O operations to that memory region. When the number of pending I/O operations against the memory region is zero, a valid bit in a protection table is set to invalid, and the real memory associated with the memory region may be swapped out. Thereafter, when the memory region is swapped back in, an address translation table is updated, the valid bit is reset, and the quiesce indicator is reset so that further I/O operations to the memory region may occur.

In this way, a memory region may be swapped out in a system area network with guarantees that additional I/O operations to the memory region will not occur during the swapping out operation. These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a diagram illustrating a portion of a distributed computer system in accordance with a preferred embodiment of the present invention in which a reliable connection service is used;

FIG. 6 is a diagram illustrating a portion of a distributed computer system in accordance with a preferred embodiment of the present invention in which reliable datagram service connections are used;

DETAILED DESCRIPTION OF THE PREFERRED EMBODIMENT

The present invention provides an apparatus and method for registering unpinned memory in a system area network (SAN). The system area network is a distributed computing system having end nodes, switches, routers, and links interconnecting these components. Each end node uses send and receive queue pairs to transmit and receives messages. The end nodes segment the message into packets and transmit the packets over the links. The switches and routers interconnect the end nodes and route the packets to the appropriate end node. The end nodes reassemble the packets into a message at the destination.

Figure 1:
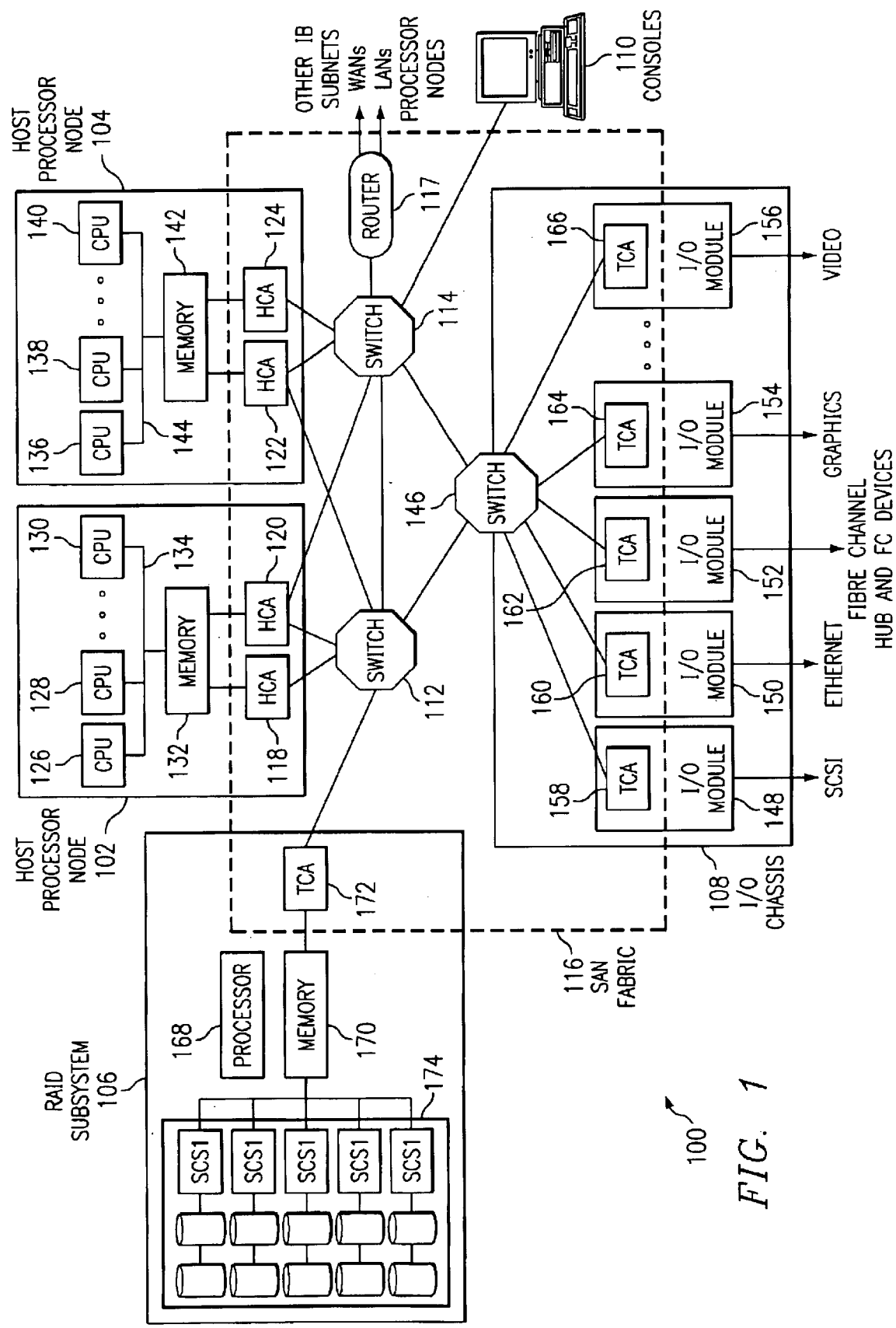
FIG. 1 is a diagram of a distributed computer system is illustrated in accordance with a preferred embodiment of the present invention.

With reference now to the figures and in particular with reference to FIG. 1, a diagram of a distributed computer system is illustrated in accordance with a preferred embodiment of the present invention. The distributed computer system represented in FIG. 1 takes the form of a system area network (SAN) 100 and is provided merely for illustrative purposes, and the embodiments of the present invention described below can be implemented on computer systems of numerous other types and configurations. For example, computer systems implementing the present invention can range from a small server with one processor and a few input/output (I/O) adapters to massively parallel supercomputer systems with hundreds or thousands of processors and thousands of I/O adapters. Furthermore, the present invention can be implemented in an infrastructure of remote computer systems connected by an internet or intranet.

SAN 100 is a high-bandwidth, low-latency network interconnecting nodes within the distributed computer system. A node is any component attached to one or more links of a network and forming the origin and/or destination of messages within the network. In the depicted example, SAN 100 includes nodes in the form of host processor node 102, host processor node 104, redundant array independent disk (RAID) subsystem node 106, and I/O chassis node 108. The nodes illustrated in FIG. 1 are for illustrative purposes only, as SAN 100 can connect any number and any type of independent processor nodes, I/O adapter nodes, and I/O device nodes. Any one of the nodes can function as an endnode, which is herein defined to be a device that originates or finally consumes messages or frames in SAN 100.

In one embodiment of the present invention, an error handling mechanism in distributed computer systems is present in which the error handling mechanism allows for reliable connection or reliable datagram communication between end nodes in distributed computing system, such as SAN 100.

A message, as used herein, is an application-defined unit of data exchange, which is a primitive unit of communication between cooperating processes. A packet is one unit of data encapsulated by networking protocol headers and/or trailers. The headers generally provide control and routing information for directing the frame through SAN. The trailer generally contains control and cyclic redundancy check (CRC) data for ensuring packets are not delivered with corrupted contents.

SAN 100 contains the communications and management infrastructure supporting both I/O and interprocessor communications (IPC) within a distributed computer system. The SAN 100 shown in FIG. 1 includes a switched communications fabric 116, which allows many devices to concurrently transfer data with high-bandwidth and low latency in a secure, remotely managed environment. Endnodes can communicate over multiple ports and utilize multiple paths through the SAN fabric. The multiple ports and paths through the SAN shown in FIG. 1 can be employed for fault tolerance and increased bandwidth data transfers.

The SAN 100 in FIG. 1 includes switch 112, switch 114, switch 146, and router 117. A switch is a device that connects multiple links together and allows routing of packets from one link to another link within a subnet using a small header Destination Local Identifier (DLID) field. A router is a device that connects multiple subnets together and is capable of routing frames from one link in a first subnet to another link in a second subnet using a large header Destination Globally Unique Identifier (DGUID).

In one embodiment, a link is a full duplex channel between any two network fabric elements, such as endnodes, switches, or routers. Example suitable links include, but are not limited to, copper cables, optical cables, and printed circuit copper traces on backplanes and printed circuit boards.

For reliable service types, endnodes, such as host processor endnodes and I/O adapter endnodes, generate request packets and return acknowledgment packets. Switches and routers pass packets along, from the source to the destination. Except for the variant CRC trailer field, which is updated at each stage in the network, switches pass the packets along unmodified. Routers update the variant CRC trailer field and modify other fields in the header as the packet is routed.

In SAN 100 as illustrated in FIG. 1, host processor node 102, host processor node 104, and I/O chassis 108 include at least one channel adapter (CA) to interface to SAN 100. In one embodiment, each channel adapter is an endpoint that implements the channel adapter interface in sufficient detail to source or sink packets transmitted on SAN fabric 100. Host processor node 102 contains channel adapters in the form of host channel adapter 118 and host channel adapter 120. Host processor node 104 contains host channel adapter 122 and host channel adapter 124. Host processor node 102 also includes central processing units 126–130 and a memory 132 interconnected by bus system 134. Host processor node 104 similarly includes central processing units 136–140 and a memory 142 interconnected by a bus system 144.

Host channel adapters 118 and 120 provide a connection to switch 112 while host channel adapters 122 and 124 provide a connection to switches 112 and 114.

In one embodiment, a host channel adapter is implemented in hardware. In this implementation, the host channel adapter hardware offloads much of central processing unit and I/O adapter communication overhead. This hardware implementation of the host channel adapter also permits multiple concurrent communications over a switched network without the traditional overhead associated with communicating protocols.

In one embodiment, the host channel adapters and SAN 100 in FIG. 1 provide the I/O and interprocessor communications (IPC) consumers of the distributed computer system with zero processor-copy data transfers without involving the operating system kernel process, and employs hardware to provide reliable, fault tolerant communications. As indicated in FIG. 1, router 116 is coupled to wide area network (WAN) and/or local area network (LAN) connections to other hosts or other routers.

The I/O chassis 108 in FIG. 1 includes an I/O switch 146 and multiple I/O modules 148–156. In these examples, the I/O modules take the form of adapter cards. Example adapter cards illustrated in FIG. 1 include a SCSI adapter card for I/O module 148; an adapter card to fiber channel hub and fiber channel-arbitrated loop (FC-AL) devices for I/O module 152; an ethernet adapter card for I/O module 150; a graphics adapter card for I/O module 154; and a video adapter card for I/O module 156. Any known type of adapter card can be implemented. I/O adapters also include a switch in the I/O adapter backplane to couple the adapter cards to the SAN fabric. These modules contain target channel adapters 158–166.

In this example, RAID subsystem node 106 in FIG. 1 includes a processor 168, a memory 170, a target channel adapter (TCA) 172, and multiple redundant and/or striped storage disk unit 174. Target channel adapter 172 can be a fully functional host channel adapter.

SAN 100 handles data communications for I/O and interprocessor communications. SAN 100 supports high-bandwidth and scalability required for I/O and also supports the extremely low latency and low CPU overhead required for interprocessor communications. User clients can bypass the operating system kernel process and directly access network communication hardware, such as host channel adapters, which enable efficient message passing protocols. SAN 100 is suited to current computing models and is a building block for new forms of I/O and computer cluster communication. Further, SAN 100 in FIG. 1 allows I/O adapter nodes to communicate among themselves or communicate with any or all of the processor nodes in distributed computer system. With an I/O adapter attached to the SAN 100, the resulting I/O adapter node has substantially the same communication capability as any host processor node in SAN 100.

In one embodiment, the SAN 100 shown in FIG. 1 supports channel semantics and memory semantics. Channel semantics is sometimes referred to as send/receive or push communication operations. Channel semantics are the type of communications employed in a traditional I/O channel where a source device pushes data and a destination device determines a final destination of the data. In channel semantics, the packet transmitted from a source process specifies a destination processes' communication port, but does not specify where in the destination processes' memory space the packet will be written. Thus, in channel semantics, the destination process pre-allocates where to place the transmitted data.

In memory semantics, a source process directly reads or writes the virtual address space of a remote node destination process. The remote destination process need only communicate the location of a buffer for data, and does not need to be involved in the transfer of any data. Thus, in memory semantics, a source process sends a data packet containing the destination buffer memory address of the destination process. In memory semantics, the destination process previously grants permission for the source process to access its memory.

Channel semantics and memory semantics are typically both necessary for I/O and interprocessor communications. A typical I/O operation employs a combination of channel and memory semantics. In an illustrative example I/O operation of the distributed computer system shown in FIG. 1, a host processor node, such as host processor node 102, initiates an I/O operation by using channel semantics to send a disk write command to a disk I/O adapter, such as RAID subsystem target channel adapter (TCA) 172. The disk I/O adapter examines the command and uses memory semantics to read the data buffer directly from the memory space of the host processor node. After the data buffer is read, the disk I/O adapter employs channel semantics to push an I/O completion message back to the host processor node.

In one exemplary embodiment, the distributed computer system shown in FIG. 1 performs operations that employ virtual addresses and virtual memory protection mechanisms to ensure correct and proper access to all memory. Applications running in such a distributed computed system are not required to use physical addressing for any operations.

Figure 2:
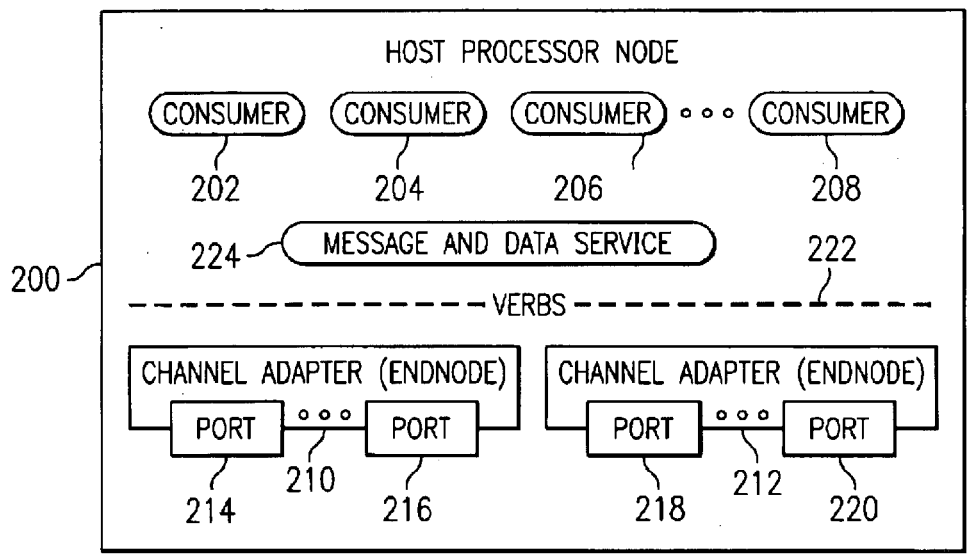
FIG. 2 is a functional block diagram of a host processor node in accordance with a preferred embodiment of the present invention.

Turning next to FIG. 2, a functional block diagram of a host processor node is depicted in accordance with a preferred embodiment of the present invention. Host processor node 200 is an example of a host processor node, such as host processor node 102 in FIG. 1.

In this example, host processor node 200 shown in FIG. 2 includes a set of consumers 202–208, which are processes executing on host processor node 200. Host processor node 200 also includes channel adapter 210 and channel adapter 212. Channel adapter 210 contains ports 214 and 216 while channel adapter 212 contains ports 218 and 220. Each port connects to a link. The ports can connect to one SAN subnet or multiple SAN subnets, such as SAN 100 in FIG. 1. In these examples, the channel adapters take the form of host channel adapters.

Consumers 202–208 transfer messages to the SAN via the verbs interface 222 and message and data service 224. A verbs interface is essentially an abstract description of the functionality of a host channel adapter. An operating system may expose some or all of the verb functionality through its programming interface. Basically, this interface defines the behavior of the host. Additionally, host processor node 200 includes a message and data service 224, which is a higher-level interface than the verb layer and is used to process messages and data received through channel adapter 210 and channel adapter 212. Message and data service 224 provides an interface to consumers 202–208 to process messages and other data.

Figure 3A:
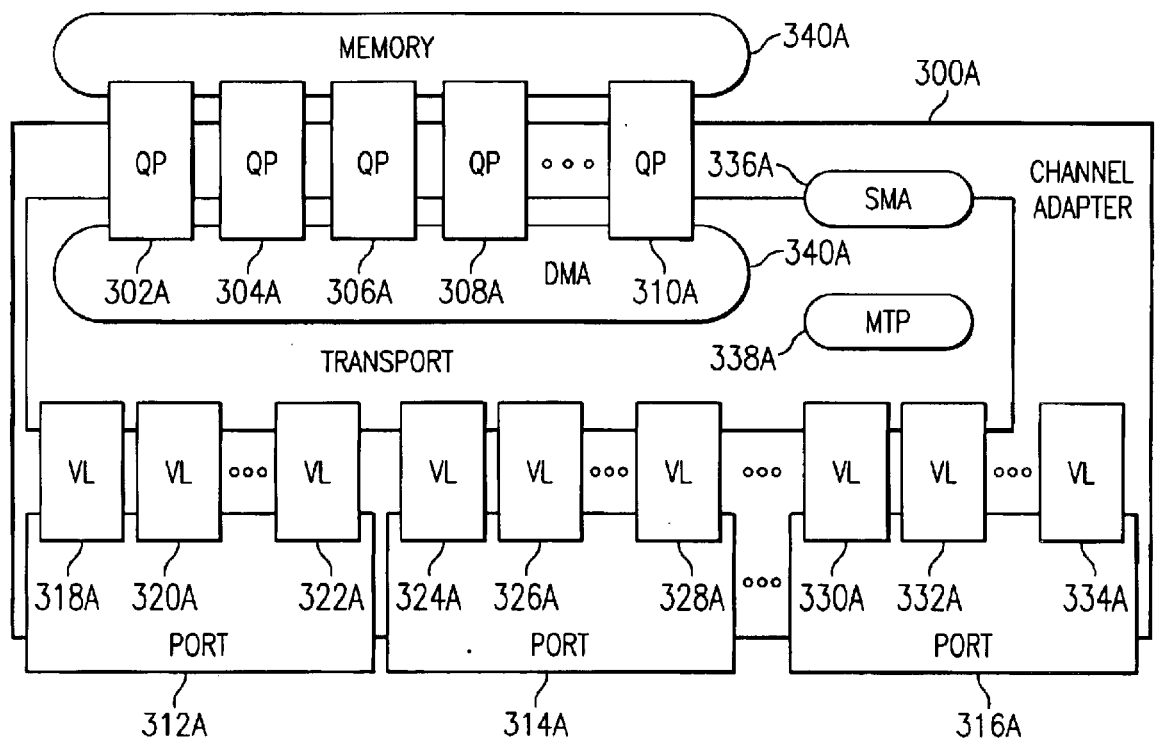
FIG. 3A is a diagram of a host channel adapter in accordance with a preferred embodiment of the present invention.

With reference now to FIG. 3A, a diagram of a host channel adapter is depicted in accordance with a preferred embodiment of the present invention. Host channel adapter 300A shown in FIG. 3A includes a set of queue pairs (QPs) 302A–310A, which are used to transfer messages to the host channel adapter ports 312A–316A. Buffering of data to host channel adapter ports 312A–316A is channeled through virtual lanes (VL) 318A–334A where each VL has its own flow control. Subnet manager configures channel adapters with the local addresses for each physical port, i.e., the port's LID.

Subnet manager agent (SMA) 336A is the entity that communicates with the subnet manager for the purpose of configuring the channel adapter. Memory translation and protection (MTP) 338A is a mechanism that translates virtual addresses to physical addresses and validates access rights. Direct memory access (DMA) 340A provides for direct memory access operations using memory 340A with respect to queue pairs 302A–310A.

A single channel adapter, such as the host channel adapter 300A shown in FIG. 3A, can support thousands of queue pairs. By contrast, a target channel adapter in an I/O adapter typically supports a much smaller number of queue pairs. Each queue pair consists of a send work queue (SWQ) and a receive work queue. The send work queue is used to send channel and memory semantic messages. The receive work queue receives channel semantic messages. A consumer calls an operating-system specific programming interface, which is herein referred to as verbs, to place work requests (WRs) onto a work queue.

Figure 3B:
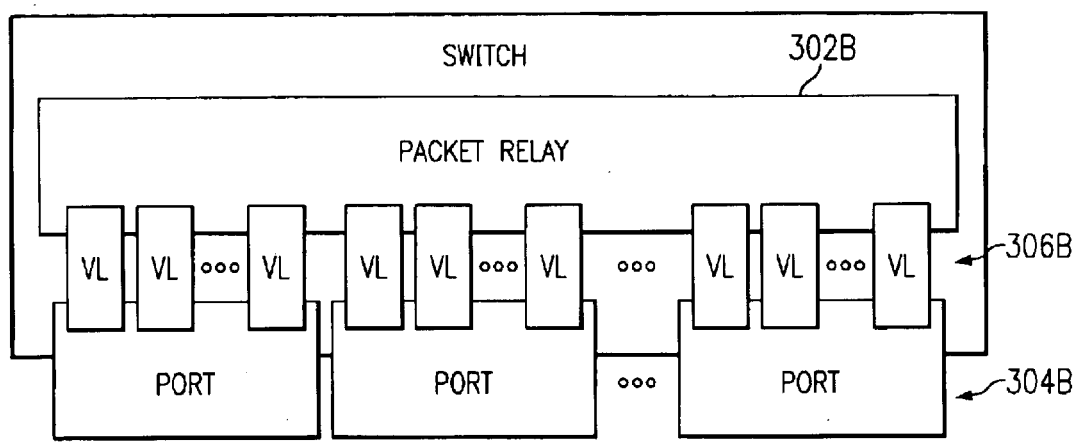
FIG. 3B is a diagram of a switch in accordance with a preferred embodiment of the present invention.

FIG. 3B depicts a switch 300B in accordance with a preferred embodiment of the present invention. Switch 300B includes a packet relay 302B in communication with a number of ports 304B through virtual lanes such as virtual lane 306B. Generally, a switch such as switch 300B can route packets from one port to any other port on the same switch.

Figure 3C:
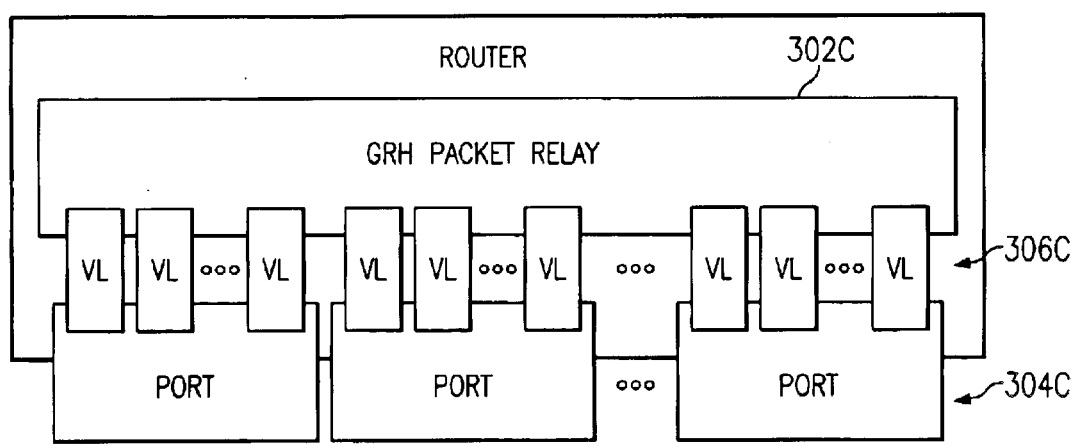
FIG. 3C is a diagram of a router in accordance with a preferred embodiment of the present invention.

Similarly, FIG. 3C depicts a router 300C according to a preferred embodiment of the present invention. Router 300C includes a packet relay 302C in communication with a number of ports 304C through virtual lanes such as virtual lane 306C. Like switch 300B, router 300C will generally be able to route packets from one port to any other port on the same router.

Channel adapters, switches, and routers employ multiple virtual lanes within a single physical link. As illustrated in FIGS. 3A, 3B, and 3C, physical ports connect endnodes, switches, and routers to a subnet. Packets injected into the SAN fabric follow one or more virtual lanes from the packet's source to the packet's destination. The virtual lane that is selected is mapped from a service level associated with the packet. At any one time, only one virtual lane makes progress on a given physical link. Virtual lanes provide a technique for applying link level flow control to one virtual lane without affecting the other virtual lanes. When a packet on one virtual lane blocks due to contention, quality of service (QoS), or other considerations, a packet on a different virtual lane is allowed to make progress.

Virtual lanes are employed for numerous reasons, some of which are as follows: Virtual lanes provide QoS. In one example embodiment, certain virtual lanes are reserved for high priority or isochronous traffic to provide QoS.

Virtual lanes provide deadlock avoidance. Virtual lanes allow topologies that contain loops to send packets across all physical links and still be assured the loops won't cause back pressure dependencies that might result in deadlock.

Virtual lanes alleviate head-of-line blocking. When a switch has no more credits available for packets that utilize a given virtual lane, packets utilizing a different virtual lane that has sufficient credits are allowed to make forward progress.

Figure 4:
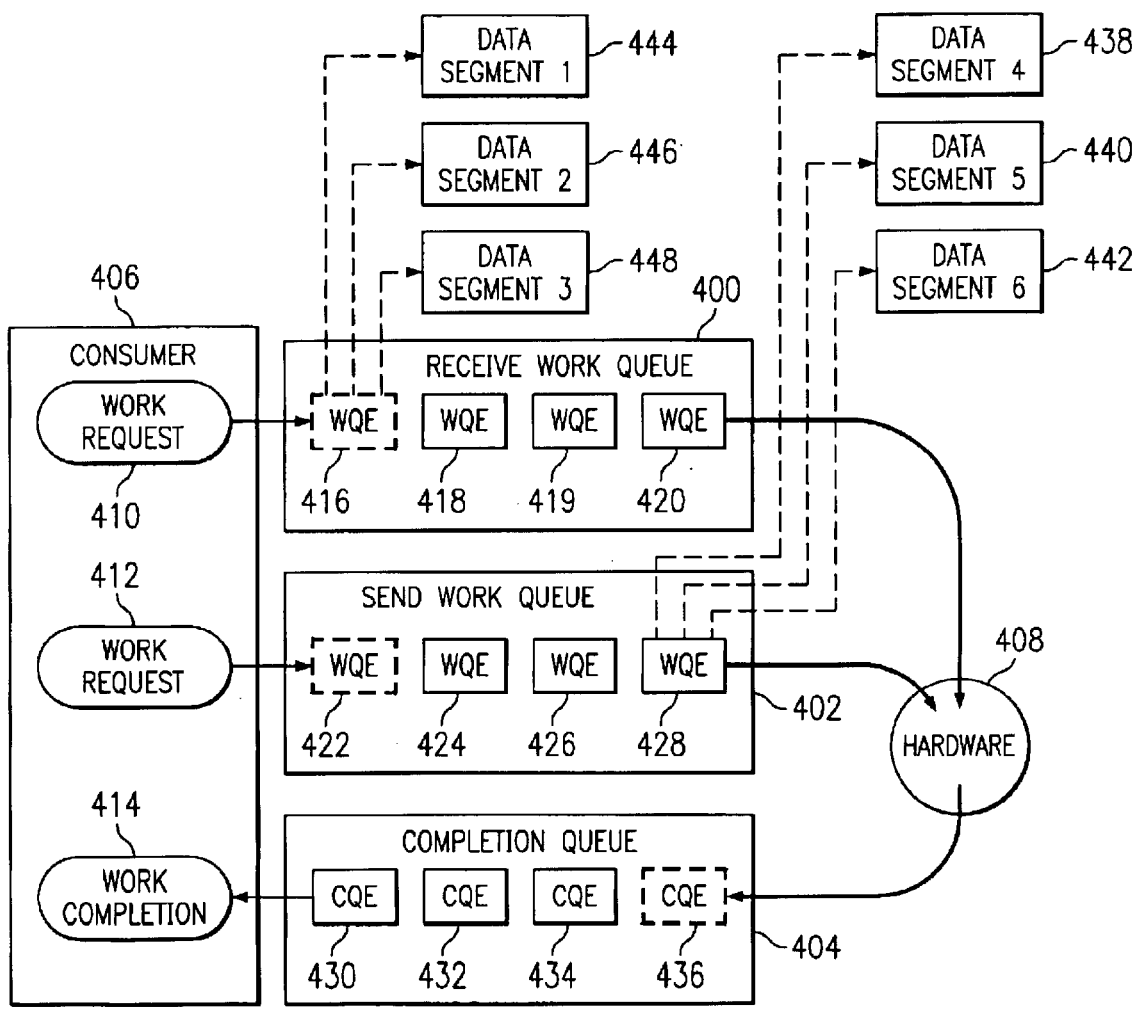
FIG. 4 is a diagram illustrating processing of work requests in accordance with a preferred embodiment of the present invention.

With reference now to FIG. 4, a diagram illustrating processing of work requests is depicted in accordance with a preferred embodiment of the present invention. In FIG. 4, a receive work queue 400, send work queue 402, and completion queue 404 are present for processing requests from and for consumer 406. These requests from consumer 402 are eventually sent to hardware 408. In this example, consumer 406 generates work requests 410 and 412 and receives work completion 414. As shown in FIG. 4, work requests placed onto a work queue are referred to as work queue elements (WQEs).

Send work queue 402 contains work queue elements (WQEs) 422–428, describing data to be transmitted on the SAN fabric. Receive work queue 400 contains work queue elements (WQEs) 416–420, describing where to place incoming channel semantic data from the SAN fabric. A work queue element is processed by hardware 408 in the host channel adapter.

The verbs also provide a mechanism for retrieving completed work from completion queue 404. As shown in FIG. 4, completion queue 404 contains completion queue elements (CQEs) 430–436. Completion queue elements contain information about previously completed work queue elements. Completion queue 404 is used to create a single point of completion notification for multiple queue pairs. A completion queue element is a data structure on a completion queue. This element describes a completed work queue element. The completion queue element contains sufficient information to determine the queue pair and specific work queue element that completed. A completion queue context is a block of information that contains pointers to, length, and other information needed to manage the individual completion queues.

Example work requests supported for the send work queue 402 shown in FIG. 4 are as follows. A send work request is a channel semantic operation to push a set of local data segments to the data segments referenced by a remote node's receive work queue element. For example, work queue element 428 contains references to data segment 4 438, data segment 5 440, and data segment 6 442. Each of the send work request's data segments contains a virtually contiguous memory region. The virtual addresses used to reference the local data segments are in the address context of the process that created the local queue pair.

A remote direct memory access (RDMA) read work request provides a memory semantic operation to read a virtually contiguous memory space on a remote node. A memory space can either be a portion of a memory region or portion of a memory window. A memory region references a previously registered set of virtually contiguous memory addresses defined by a virtual address and length. A memory window references a set of virtually contiguous memory addresses that have been bound to a previously registered region.

The RDMA Read work request reads a virtually contiguous memory space on a remote endnode and writes the data to a virtually contiguous local memory space. Similar to the send work request, virtual addresses used by the RDMA Read work queue element to reference the local data segments are in the address context of the process that created the local queue pair. For example, work queue element 416 in receive work queue 400 references data segment 1 444, data segment 2 446, and data segment 448. The remote virtual addresses are in the address context of the process owning the remote queue pair targeted by the RDMA Read work queue element.

A RDMA Write work queue element provides a memory semantic operation to write a virtually contiguous memory space on a remote node. The RDMA Write work queue element contains a scatter list of local virtually contiguous memory spaces and the virtual address of the remote memory space into which the local memory spaces are written.

A RDMA FetchOp work queue element provides a memory semantic operation to perform an atomic operation on a remote word. The RDMA FetchOp work queue element is a combined RDMA Read, Modify, and RDMA Write operation. The RDMA FetchOp work queue element can support several read-modify-write operations, such as Compare and Swap if equal.

A bind (unbind) remote access key (R_Key) work queue element provides a command to the host channel adapter hardware to modify (destroy) a memory window by associating (disassociating) the memory window to a memory region. The R_Key is part of each RDMA access and is used to validate that the remote process has permitted access to the buffer.

In one embodiment, receive work queue 400 shown in FIG. 4 only supports one type of work queue element, which is referred to as a receive work queue element. The receive work queue element provides a channel semantic operation describing a local memory space into which incoming send messages are written. The receive work queue element includes a scatter list describing several virtually contiguous memory spaces. An incoming send message is written to these memory spaces. The virtual addresses are in the address context of the process that created the local queue pair.

For interprocessor communications, a user-mode software process transfers data through queue pairs directly from where the buffer resides in memory. In one embodiment, the transfer through the queue pairs bypasses the operating system and consumes few host instruction cycles. Queue pairs permit zero processor-copy data transfer with no operating system kernel involvement. The zero processor-copy data transfer provides for efficient support of high-bandwidth and low-latency communication.

When a queue pair is created, the queue pair is set to provide a selected type of transport service. In one embodiment, a distributed computer system implementing the present invention supports four types of transport services: reliable, unreliable, reliable datagram, and unreliable datagram connection service.

Reliable and Unreliable connected services associate a local queue pair with one and only one remote queue pair. Connected services require a process to create a queue pair for each process that is to communicate with over the SAN fabric. Thus, if each of N host processor nodes contain P processes, and all P processes on each node wish to communicate with all the processes on all the other nodes, each host processor node requires $P^2 \times (N-1)$ queue pairs. Moreover, a process can connect a queue pair to another queue pair on the same host channel adapter.

A portion of a distributed computer system employing a reliable connection service to communicate between distributed processes is illustrated generally in FIG. 5. The distributed computer system 500 in FIG. 5 includes a host processor node 1, a host processor node 2, and a host processor node 3. Host processor node 1 includes a process A 510. Host processor node 2 includes a process C 520 and a process D 530. Host processor node 3 includes a process E 540.

Host processor node 1 includes queue pairs 4, 6 and 7, each having a send work queue and receive work queue. Host processor node 2 has a queue pair 9 and host processor node 3 has queue pairs 2 and 5. The reliable connection service of distributed computer system 500 associates a local queue pair with one an only one remote queue pair. Thus, the queue pair 4 is used to communicate with queue pair 2; queue pair 7 is used to communicate with queue pair 5; and queue pair 6 is used to communicate with queue pair 9.

A WQE placed on one queue pair in a reliable connection service causes data to be written into the receive memory space referenced by a Receive WQE of the connected queue pair. RDMA operations operate on the address space of the connected queue pair.

In one embodiment of the present invention, the reliable connection service is made reliable because hardware maintains sequence numbers and acknowledges all packet transfers. A combination of hardware and SAN driver software retries any failed communications. The process client of the queue pair obtains reliable communications even in the presence of bit errors, receive underruns, and network congestion. If alternative paths exist in the SAN fabric, reliable communications can be maintained even in the presence of failures of fabric switches, links, or channel adapter ports.

In addition, acknowledgments may be employed to deliver data reliably across the SAN fabric. The acknowledgment may, or may not, be a process level acknowledgment, i.e. an acknowledgment that validates that a receiving process has consumed the data. Alternatively, the acknowledgment may be one that only indicates that the data has reached its destination.

Reliable datagram service associates a local end-to-end (EE) context with one and only one remote end-to-end context. The reliable datagram service permits a client process of one queue pair to communicate with any other queue pair on any other remote node. At a receive work queue, the reliable datagram service permits incoming messages from any send work queue on any other remote node.

The reliable datagram service greatly improves scalability because the reliable datagram service is connectionless. Therefore, an endnode with a fixed number of queue pairs can communicate with far more processes and endnodes with a reliable datagram service than with a reliable connection transport service. For example, if each of N host processor nodes contain P processes, and all P processes on each node wish to communicate with all the processes on all the other nodes, the reliable connection service requires $P^2 \times (N-1)$ queue pairs on each node. By comparison, the connectionless reliable datagram service only requires P queue pairs+(N-1) EE contexts on each node for exactly the same communications.

A portion of a distributed computer system employing a reliable datagram service to communicate between distributed processes is illustrated in FIG. 6. The distributed computer system 600 in FIG. 6 includes a host processor node 1, a host processor node 2, and a host processor node 3. Host processor node 1 includes a process A 610 having a queue pair 4. Host processor node 2 has a process C 620 having a queue pair 24 and a process D 630 having a queue pair 25. Host processor node 3 has a process E 640 having a queue pair 14.

In the reliable datagram service implemented in the distributed computer system 600, the queue pairs are coupled in what is referred to as a connectionless transport service. For example, a reliable datagram service couples queue pair 4 to queue pairs 24, 25 and 14. Specifically, a reliable datagram service allows queue pair 4's send work queue to reliably transfer messages to receive work queues in queue pairs 24, 25 and 14. Similarly, the send queues of queue pairs 24, 25, and 14 can reliably transfer messages to the receive work queue in queue pair 4.

In one embodiment of the present invention, the reliable datagram service employs sequence numbers and acknowledgments associated with each message frame to ensure the same degree of reliability as the reliable connection service. End-to-end (EE) contexts maintain end-to-end specific state to keep track of sequence numbers, acknowledgments, and time-out values. The end-to-end state held in the EE contexts is shared by all the connectionless queue pairs communication between a pair of endnodes. Each endnode requires at least one EE context for every endnode it wishes to communicate with in the reliable datagram service (e.g., a given endnode requires at least N EE contexts to be able to have reliable datagram service with N other endnodes).

The unreliable datagram service is connectionless. The unreliable datagram service is employed by management applications to discover and integrate new switches, routers, and endnodes into a given distributed computer system. The unreliable datagram service does not provide the reliability guarantees of the reliable connection service and the reliable datagram service. The unreliable datagram service accordingly operates with less state information maintained at each endnode.

Figure 7:
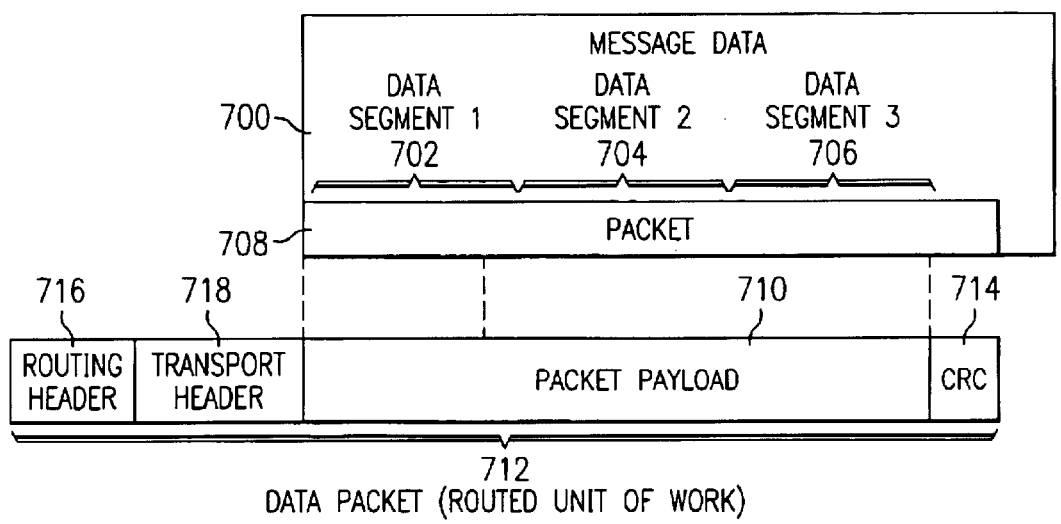
FIG. 7 is an illustration of a data packet in accordance with a preferred embodiment of the present invention.

Turning next to FIG. 7, an illustration of a data packet is depicted in accordance with a preferred embodiment of the present invention. A data packet is a unit of information that is routed through the SAN fabric. The data packet is an endnode-to-endnode construct, and is thus created and consumed by endnodes. For packets destined to a channel adapter (either host or target), the data packets are neither generated nor consumed by the switches and routers in the SAN fabric. Instead for data packets that are destined to a channel adapter, switches and routers simply move request packets or acknowledgment packets closer to the ultimate destination, modifying the variant link header fields in the process. Routers, also modify the packet's network header when the packet crosses a subnet boundary. In traversing a subnet, a single packet stays on a single service level.

Message data 700 contains data segment 1 702, data segment 2 704, and data segment 3 706, which are similar to the data segments illustrated in FIG. 4. In this example, these data segments form a packet 708, which is placed into packet payload 710 within data packet 712. Additionally, data packet 712 contains CRC 714, which is used for error checking. Additionally, routing header 716 and transport 718 are present in data packet 712. Routing header 716 is used to identify source and destination ports for data packet 712. Transport header 718 in this example specifies the destination queue pair for data packet 712. Additionally, transport header 718 also provides information such as the operation code, packet sequence number, and partition for data packet 712.

The operating code identifies whether the packet is the first, last, intermediate, or only packet of a message. The operation code also specifies whether the operation is a send RDMA write, read, or atomic. The packet sequence number is initialized when communication is established and increments each time a queue pair creates a new packet. Ports of an endnode may be configured to be members of one or more possibly overlapping sets called partitions.

Figure 8:
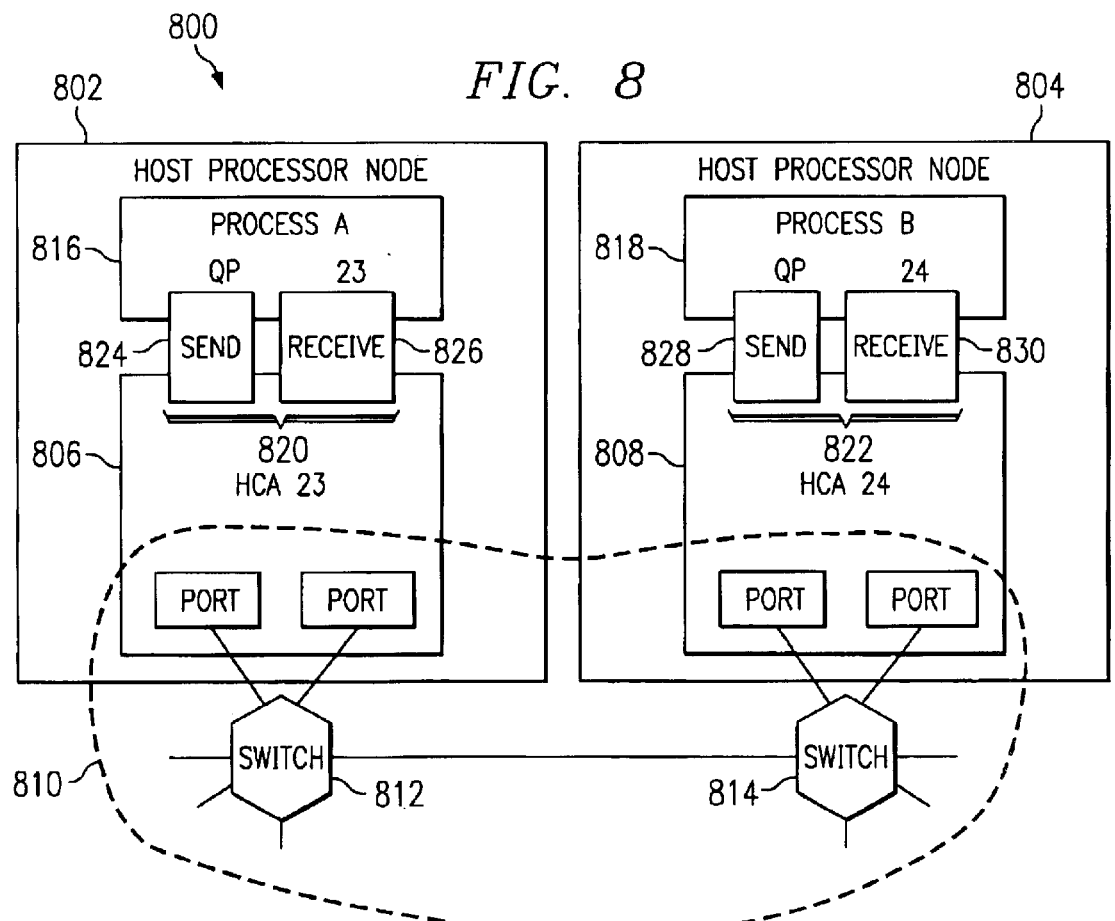
FIG. 8 is a diagram illustrating a portion of a distributed computer system in accordance with a preferred embodiment of the present invention.

In FIG. 8, a portion of a distributed computer system is depicted to illustrate an example request and acknowledgment transaction. The distributed computer system in FIG. 8 includes a host processor node 802 and a host processor node 804. Host processor node 802 includes a host channel adapter 806. Host processor node 804 includes a host channel adapter 808. The distributed computer system in FIG. 8 includes a SAN fabric 810, which includes a switch 812 and a switch 814. The SAN fabric includes a link coupling host channel adapter 806 to switch 812; a link coupling switch 812 to switch 814; and a link coupling host channel adapter 808 to switch 814.

In the example transactions, host processor node 802 includes a client process A. Host processor node 804 includes a client process B. Client process A interacts with host channel adapter hardware 806 through queue pair 824. Client process B interacts with hardware channel adapter hardware 808 through queue pair 828. Queue pairs 824 and 828 are data structures that include a send work queue and a receive work queue.

Process A initiates a message request by posting work queue elements to the send queue of queue pair 824. Such a work queue element is illustrated in FIG. 4. The message request of client process A is referenced by a gather list contained in the send work queue element. Each data segment in the gather list points to a virtually contiguous local memory region, which contains a part of the message, such as indicated by data segments 1, 2, and 3, which respectively hold message parts 1, 2, and 3, in FIG. 4.

Hardware in host channel adapter 806 reads the work queue element and segments the message stored in virtual contiguous buffers into data packets, such as the data packet illustrated in FIG. 7. Data packets are routed through the SAN fabric, and for reliable transfer services, are acknowledged by the final destination endnode. If not successively acknowledged, the data packet is retransmitted by the source endnode. Data packets are generated by source endnodes and consumed by destination endnodes.

Figure 9:
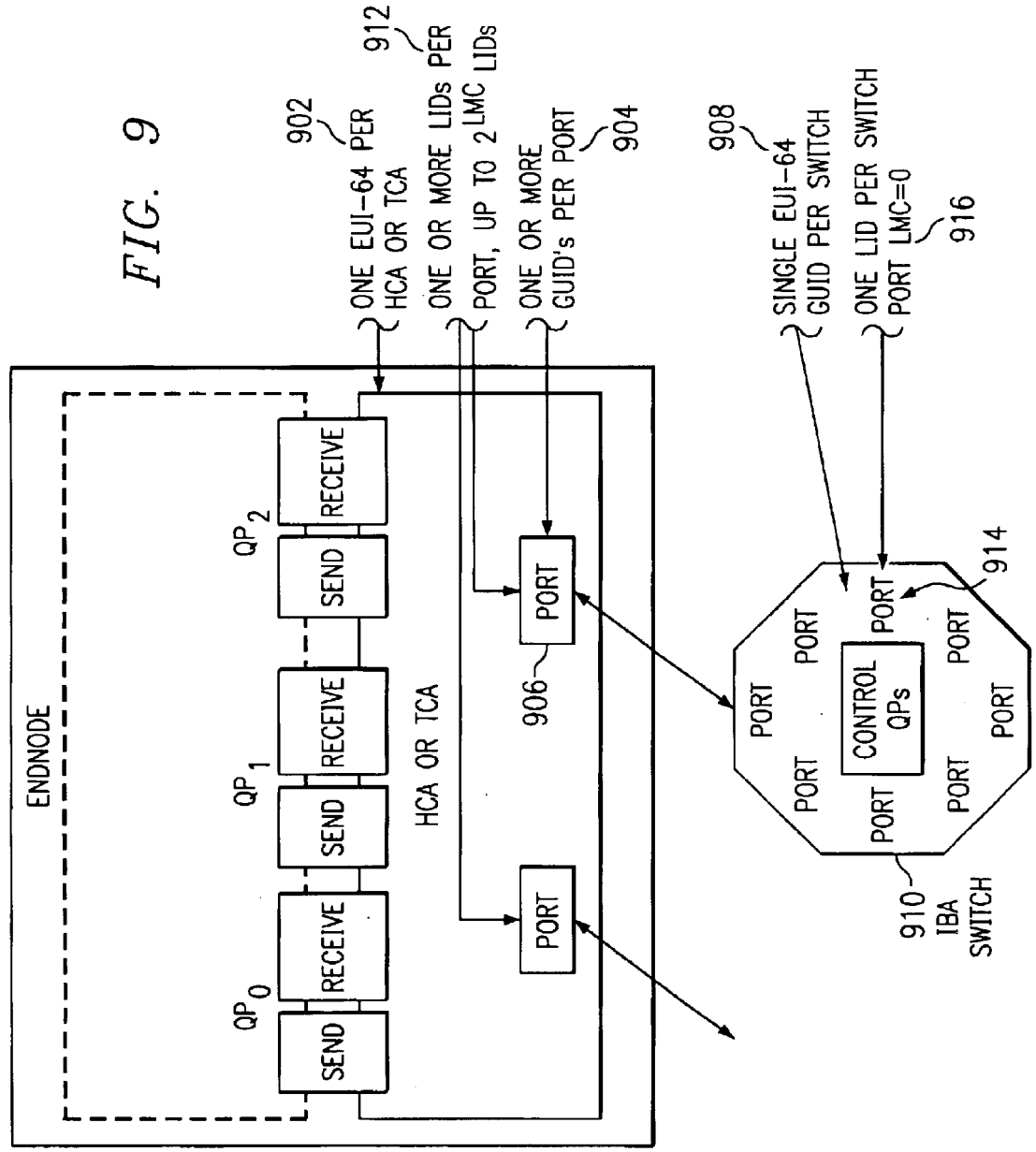
FIG. 9 is a diagram illustrating the network addressing used in a distributed networking system in accordance with the present invention.

In reference to FIG. 9, a diagram illustrating the network addressing used in a distributed networking system is depicted in accordance with the present invention. A host name provides a logical identification for a host node, such as a host processor node or I/O adapter node. The host name identifies the endpoint for messages such that messages are destined for processes residing on an end node specified by the host name. Thus, there is one host name per node, but a node can have multiple CAs.

A single IEEE assigned 64-bit identifier (EUI-64) 902 is assigned to each component. A component can be a switch, router, or CA.

One or more globally unique ID (GUID) identifies 904 are assigned per CA port 906. Multiple GUIDs (a.k.a. IP addresses) can be used for several reasons, some of which are illustrated by the following examples. In one embodiment, different IP addresses identify different partitions or services on an end node. In a different embodiment, different IP addresses are used to specify different Quality of Service (QoS) attributes. In yet another embodiment, different IP addresses identify different paths through intra-subnet routes. One GUID 908 is assigned to a switch 910.

A local ID (LID) refers to a short address ID used to identify a CA port within a single subnet. In one example embodiment, a subnet has up to 216 end nodes, switches, and routers, and the LID is accordingly 16 bits. A source LID (SLID) and a destination LID (DLID) are the source and destination LIDs used in a local network header. A single CA port 1006 has up to $2^{LMC}$ LIDs 912 assigned to it. The LMC represents the LID Mask Control field in the CA. A mask is a pattern of bits used to accept or reject bit patterns in another set of data.

Multiple LIDs can be used for several reasons some of which are provided by the following examples. In one embodiment, different LIDs identify different partitions or services in an end node. In another embodiment, different LIDs are used to specify different QoS attributes. In yet a further embodiment, different LIDs specify different paths through the subnet. A single switch port 914 has one LID 916 associated with it.

A one-to-one correspondence does not necessarily exist between LIDs and GUIDs, because a CA can have more or less LIDs than GUIDs for each port. For CAs with redundant ports and redundant conductivity to multiple SAN fabrics, the CAs can, but are not required to, use the same LID and GUID on each of its ports.

Figure 10:
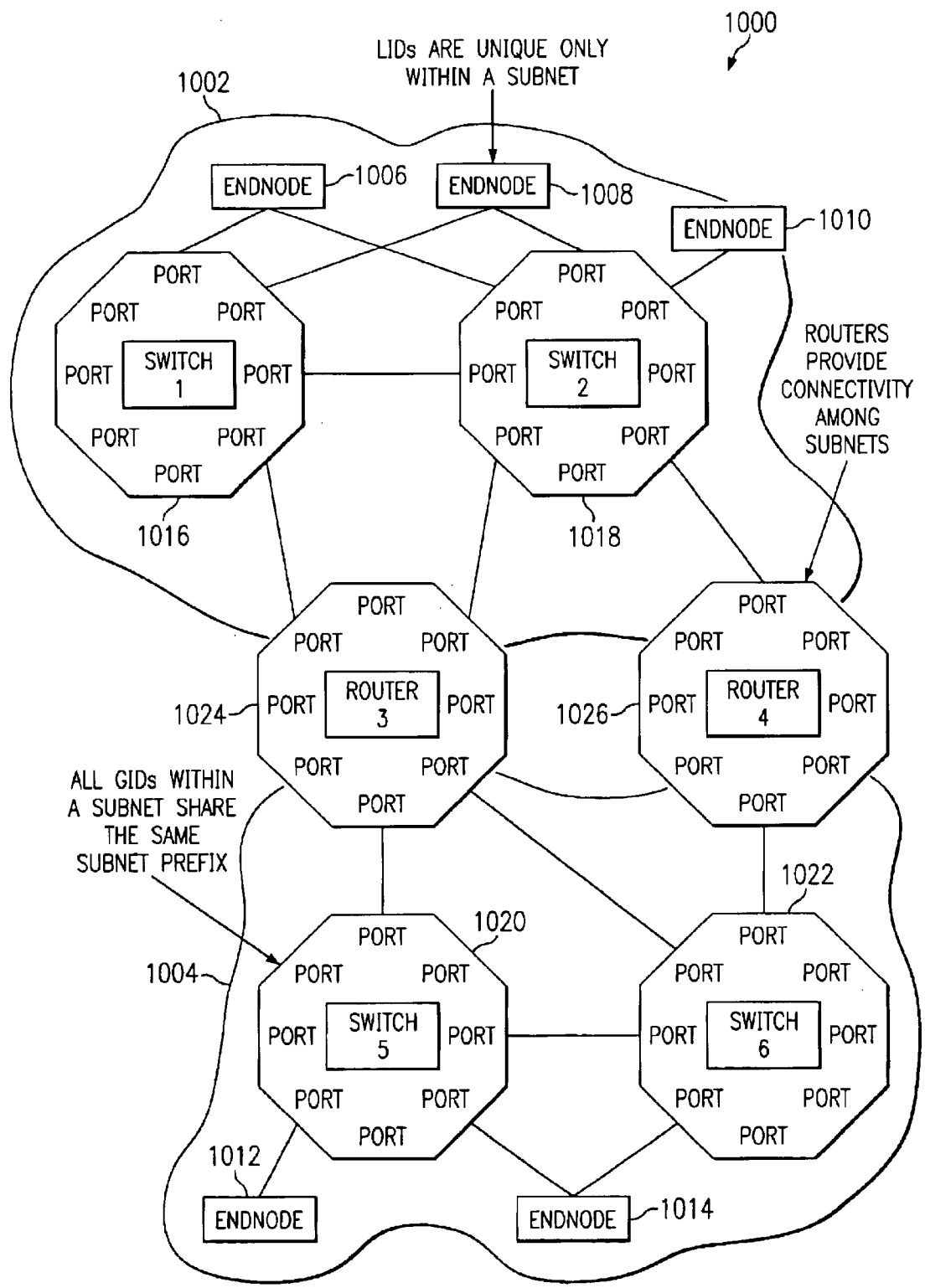
FIG. 10 is a diagram illustrating a portion of a distributed computing system in accordance with a preferred embodiment of the present invention in which the structure of SAN fabric subnets is illustrated.

A portion of a distributed computer system in accordance with a preferred embodiment of the present invention is illustrated in FIG. 10. Distributed computer system 1000 includes a subnet 1002 and a subnet 1004. Subnet 1002 includes host processor nodes 1006, 1008, and 1010. Subnet 1004 includes host processor nodes 1012 and 1014. Subnet 1002 includes switches 1016 and 1018. Subnet 1004 includes switches 1020 and 1022.

Routers connect subnets. For example, subnet 1002 is connected to subnet 1004 with routers 1024 and 1026. In one example embodiment, a subnet has up to 216 endnodes, switches, and routers.

A subnet is defined as a group of endnodes and cascaded switches that is managed as a single unit. Typically, a subnet occupies a single geographic or functional area. For example, a single computer system in one room could be defined as a subnet. In one embodiment, the switches in a subnet can perform very fast wormhole or cut-through routing for messages.

A switch within a subnet examines the DLID that is unique within the subnet to permit the switch to quickly and efficiently route incoming message packets. In one embodiment, the switch is a relatively simple circuit, and is typically implemented as a single integrated circuit. A subnet can have hundreds to thousands of endnodes formed by cascaded switches.

As illustrated in FIG. 10, for expansion to much larger systems, subnets are connected with routers, such as routers 1024 and 1026. The router interprets the IP destination ID (e.g., IPv6 destination ID) and routes the IP-like packet.

An example embodiment of a switch is illustrated generally in FIG. 3B. Each I/O path on a switch or router has a port. Generally, a switch can route packets from one port to any other port on the same switch.

Within a subnet, such as subnet 1002 or subnet 1004, a path from a source port to a destination port is determined by the LID of the destination host channel adapter port. Between subnets, a path is determined by the IP address (e.g., IPv6 address) of the destination host channel adapter port and by the LID address of the router port which will be used to reach the destination's subnet.

In one embodiment, the paths used by the request packet and the request packet's corresponding positive acknowledgment (ACK) or negative acknowledgment (NAK) frame are not required to be symmetric. In one embodiment employing oblivious routing, switches select an output port based on the DLID. In one embodiment, a switch uses one set of routing decision criteria for all its input ports. In one example embodiment, the routing decision criteria are contained in one routing table. In an alternative embodiment, a switch employs a separate set of criteria for each input port. A data transaction in the distributed computer system of the present invention is typically composed of several hardware and software steps. A client process data transport service can be a user-mode or a kernel-mode process. The client process accesses host channel adapter hardware through one or more queue pairs, such as the queue pairs illustrated in FIGS. 3A, 5, and 6. The client process calls an operating-system specific programming interface, which is herein referred to as "verbs." The software code implementing verbs posts a work queue element to the given queue pair work queue.

There are many possible methods of posting a work queue element and there are many possible work queue element formats, which allow for various cost/performance design points, but which do not affect interoperability. A user process, however, must communicate to verbs in a well-defined manner, and the format and protocols of data transmitted across the SAN fabric must be sufficiently specified to allow devices to interoperate in a heterogeneous vendor environment.

In one embodiment, channel adapter hardware detects work queue element postings and accesses the work queue element. In this embodiment, the channel adapter hardware translates and validates the work queue element's virtual addresses and accesses the data.

An outgoing message is split into one or more data packets. In one embodiment, the channel adapter hardware adds a transport header and a network header to each packet. The transport header includes sequence numbers and other transport information. The network header includes routing information, such as the destination IP address and other network routing information. The link header contains the Destination Local Identifier (DLID) or other local routing information. The appropriate link header is always added to the packet. The appropriate global network header is added to a given packet if the destination endnode resides on a remote subnet.

If a reliable transport service is employed, when a request data packet reaches its destination endnode, acknowledgment data packets are used by the destination endnode to let the request data packet sender know the request data packet was validated and accepted at the destination. Acknowledgment data packets acknowledge one or more valid and accepted request data packets. The requester can have multiple outstanding request data packets before it receives any acknowledgments. In one embodiment, the number of multiple outstanding messages, i.e. Request data packets, is determined when a queue pair is created.

Figure 11:
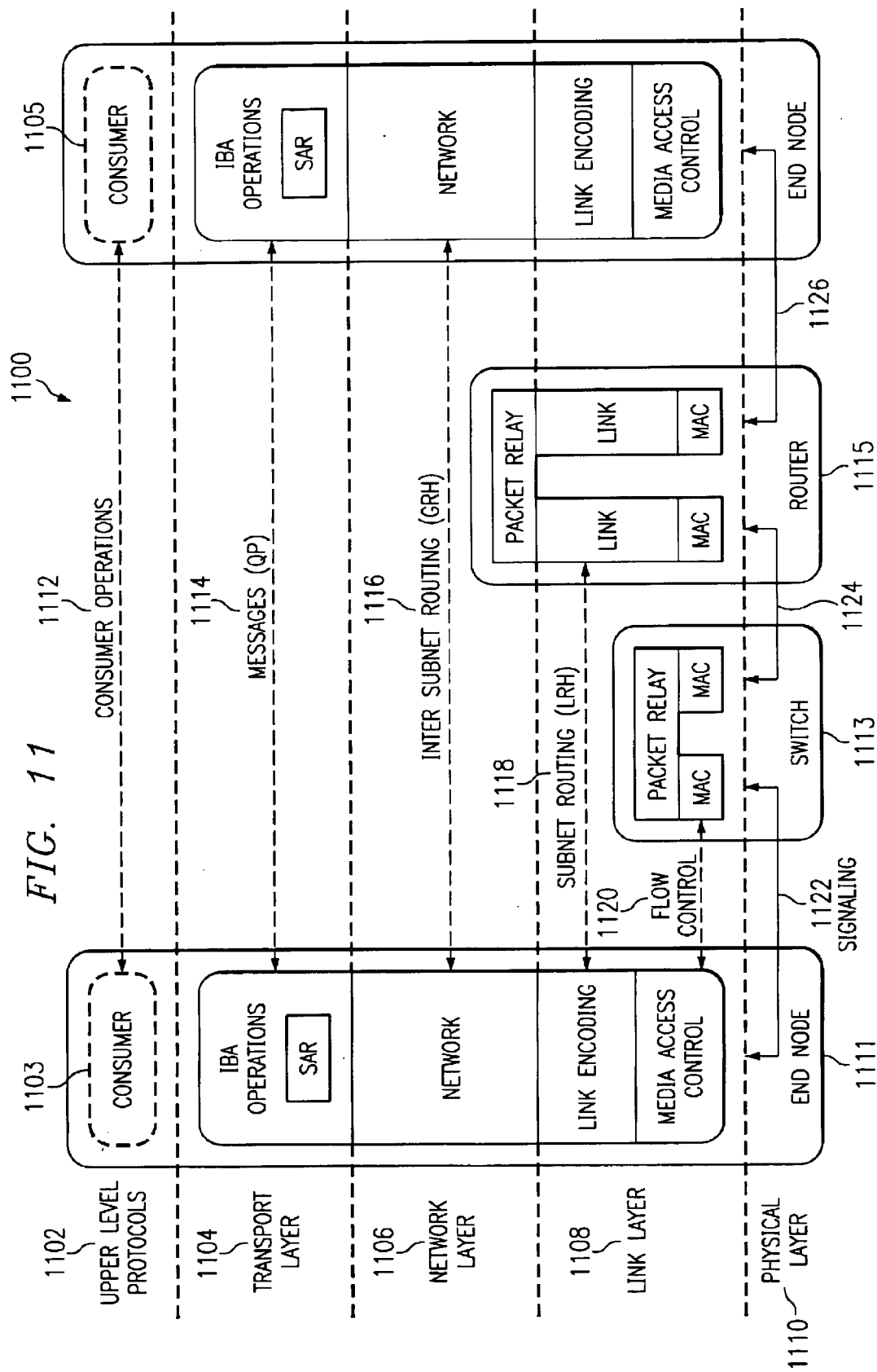
FIG. 11 is a diagram of a layered communication architecture used in a preferred embodiment of the present invention.

One embodiment of a layered architecture 1100 for implementing the present invention is generally illustrated in diagram form in FIG. 11. The layered architecture diagram of FIG. 11 shows the various layers of data communication paths, and organization of data and control information passed between layers.

Host channel adaptor endnode protocol layers (employed by endnode 1111, for instance) include an upper level protocol 1102 defined by consumer 1103, a transport layer 1104; a network layer 1106, a link layer 1108, and a physical layer 1110. Switch layers (employed by switch 1113, for instance) include link layer 1108 and physical layer 1110. Router layers (employed by router 1115, for instance) include network layer 1106, link layer 1108, and physical layer 1110.

Layered architecture 1100 generally follows an outline of a classical communication stack. With respect to the protocol layers of end node 1111, for example, upper layer protocol 1102 employs verbs (1112) to create messages at transport layer 1104. Transport layer 1104 passes messages (1114) to network layer 1106. Network layer 1106 routes packets between network subnets (1116). Link layer 1108 routes packets within a network subnet (1118). Physical layer 1110 sends bits or groups of bits to the physical layers of other devices. Each of the layers is unaware of how the upper or lower layers perform their functionality.

Consumers 1103 and 1105 represent applications or processes that employ the other layers for communicating between endnodes. Transport layer 1104 provides end-to-end message movement. In one embodiment, the transport layer provides four types of transport services as described above which are reliable connection service; reliable datagram service; unreliable datagram service; and raw datagram service. Network layer 1106 performs packet routing through a subnet or multiple subnets to destination endnodes. Link layer 1108 performs flow-controlled, error checked, and prioritized packet delivery across links.

Physical layer 1110 performs technology-dependent bit transmission. Bits or groups of bits are passed between physical layers via links 1122, 1124, and 1126. Links can be implemented with printed circuit copper traces, copper cable, optical cable, or with other suitable links.

As mentioned above, the present invention provides an apparatus and method for swapping-out real memory by inhibiting input/output (I/O) operations to an associated memory region. Swapping out of real memory refers to replacing one segment of a program in memory with another and restoring it back to the original when required. In virtual memory systems, it is sometimes referred to as "paging."

The hardware mechanisms of the SAN nodes enforce the inhibition of I/Os until the real memory has been swapped back in. Once the real memory is swapped back in, the sending of I/O requests to the memory region is again enabled. In this way, originally pinned memory may be accessed by other applications when that memory is not being accessed by the owning application.

The data segments illustrated in FIG. 4 consist of a virtual address, a length and a local key (L_Key). The L_Key is used to reference an entry that defines the characteristics of a memory region and to control access to that region. These elements define the location within a memory region that the data will be moved from (in the case of a send WQE on a send queue) or to (in the case of a receive WQE on a RQ). This data movement is also referred to as a transaction.

Memory management is the process whereby this information is used to verify the access rights for this transaction and to determine the real addresses to be used for the data transfer. The access rights include but are not limited to the following checks: the data segment defined above must fall within the memory region, if a receive operation is performed on the memory region, the memory region must allow write access, the protection domain of the QP must be the same as the protection domain of the memory region, and the like. A more detailed description of access rights is provided in commonly assigned and co-pending U.S. patent application Ser. No. 09/758,788, entitled "METHOD AND APPARATUS FOR MANAGING ACCESS TO MEMORY," filed Nov. 11, 2001, which is hereby incorporated by reference.

In addition a similar memory management process is used when this same information (virtual address, length and remote key (R_Key), which is identical in structure to an L_Key) is provided in a remote direct memory access (RDMA) packet as part of a remote access.

Figure 12:
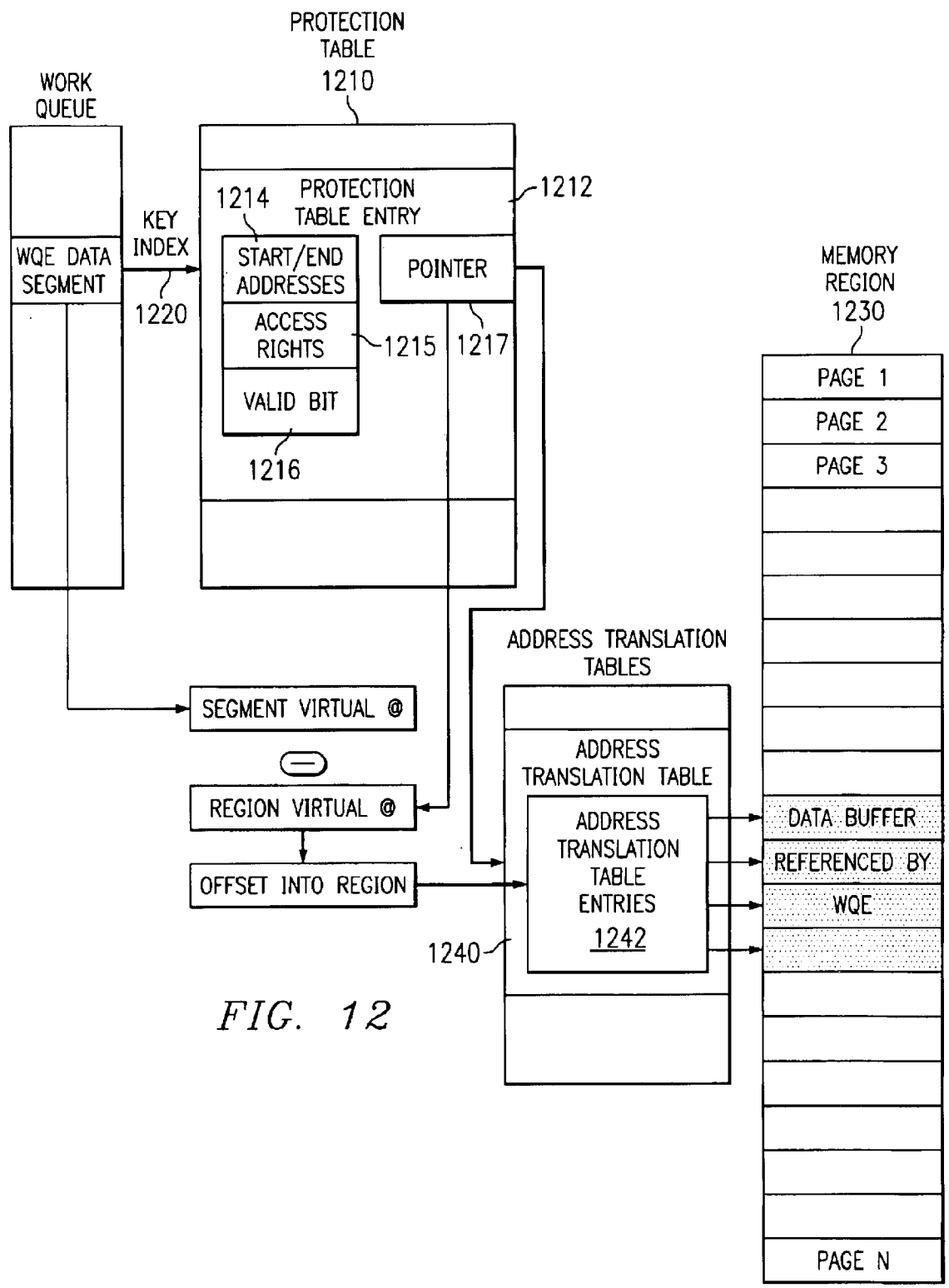
FIG. 12 is an exemplary diagram of a two table memory management structure according to the present invention.

FIG. 12 illustrates a two-table memory management scheme described in the incorporated U.S. patent application Ser. No. 09/758,188. As shown in FIG. 12, the protection table 1210 is indexed by a portion of a Local Key (L_Key) or Remote Key (R_Key), i.e. key index 1220, to access the protection table entry 1212 that is associated with a given memory region 1230.

The protection table entry 1212 defines, among other things, the starting and ending virtual address 1214 of the memory region 1230, the access rights 1215 of the region, e.g., write access allowed, remote access allowed, windows may be bound to this region, etc., and a valid bit 1216 to indicate that this is a valid protection table entry which defines the characteristics of a previously registered memory region. This valid bit is used to prevent accesses after the region is deregistered to prevent corruption of the memory that may now be owned by a new application.

In addition to the above, the protection table entry 1212 includes a pointer 1217 to an address translation table 1240 for the memory region 1230. The address translation table 1240 may be a single table or a plurality of smaller address translation tables without departing from the spirit and scope of the present invention.

The address translation table 1240 contains a list of address translation table entries 1242 which include page pointers that each consist of a real address of a page that is part of the memory region 1230. The address translation table 1240 is indexed by an offset into the memory region which is calculated by subtracting the starting virtual address of the memory region from the virtual address specified in the work queue data segment for a local access, or the data packet for a remote access. By using the protection table 1210 and the address translation table 1240 illustrated in FIG. 12, the HCA hardware is able to determine if a given access is permitted, and if so, to determine the real addresses at which the data transfer is to occur.

There may be instances when the real memory backing a memory region needs to be temporarily swapped out, such as in an environment where operating system (OS) images (called guests) themselves are virtualized by a Hypervisor (i.e. guest real memory is the Hypervisor's virtual memory). That is, in order to share the processing capabilities of a system it is possible to have multiple Operating systems running on the same hardware. Each operating system thinks it owns the hardware resources and has no knowledge of the other operating systems that are running on this hardware. Each operating system has its own address space for accessing memory. In this environment it is necessary for a controlling entity to arbitrate for access to the shared hardware resources and to translate the "virtual addresses" that each operating system is aware of into the real addresses that are implemented in the hardware. This controlling entity is typically called a Hypervisor. The virtualization of the operating system allows an operating system to co-exist with other operating systems while using the same hardware.

The InfiniBand (IB) specification, i.e. the specification covering a specific type of system area network in which the present invention may be implemented, states that this flexibility is not generally available in most IB implementations, i.e. the real memory backing memory regions is fixed for the life of the region registration. However in certain circumstances it would be beneficial to swap out real memory without negatively impacting the IB memory region or queue pair (QP) connections. There presently is no support for swapping out real memory in this manner. The present invention provides an apparatus and method for providing such support.

The specific model that is being addressed in the preferred embodiments is the master/slave model where all I/O operations are explicitly initiated by the operating system, or guest, managing the memory region. No I/O is ever initiated by the slave devices in this model. This model is very prevalent in the DASD I/O arena. While the preferred embodiments make use of the master/slave model, other models may be used without departing from the spirit and scope of the present invention.

To enable real memory swap support, the guest channel interface (CI) provides an interface to allow the consumer within the guest to communicate directly with the supporting Hypervisor. This interface may then be used by the guest consumer (not the channel interface (CI), as only the consumer has the appropriate knowledge) to guarantee that there will be no accesses to a memory region while it is swapped out. The consumer may use the interface while the channel interface cannot because the consumer is responsible for the upper-level protocol running above the SAN protocol. The CI is only aware of the SAN protocol layers. The consumer can guarantee that there will be no accesses to the memory region by not initiating any operations that access the memory region. The consumer communicates with the Hypervisor to inform the Hypervisor when it is safe to swap-out the memory region and also when the memory region needs to be paged back in so that operations may resume.

The specific interface includes defining an optional non-standard-IB current I/O field as part of the implementation of the register-memory-region verb (or an additional related verb). The register memory region verb is the mechanism that the consumer uses to define the memory region's characteristics. This results in a protection table entry being created for the region and also an L__Key being allocated for the region. Advanced consumers, i.e. consumers that support the enhanced capabilities of the present invention to allow memory regions to be swapped out, specifying this current I/O field inform the CI that the consumer understands the responsibilities involved with allowing their memory regions to be swapped out. The location of the current I/O field is then also passed to the Hypervisor as part of the memory region registration processing.

This current I/O field resides in fixed memory (from the guest's perspective) and is used by a guest to contain a count of the number of I/O's that are currently outstanding against that memory region. These I/O's may be of either channel semantic type or memory semantic type. The consumer knows when to decrement this count based upon the type of I/O that was launched. For example a SCSI command may have been sent to a SCSI device that requests a single RDMA read to be performed, after which a response is sent to the initiator's receive queue to indicate the results of this operation. In this example, if the request, reponse and RDMA data transfer are to/from the same memory region, the consumer knows that there is one send, one RDMA and one receive outstanding, giving a total count of three. When this count is zero, no I/O's are outstanding against that memory region.

It is assumed that all updates to this field are performed using atomic instructions. However, other mechanisms may be used without departing from the spirit and scope of the present invention. For example, an alternative mechanism may be to wait for the completion response from the device, which guarantees that the preceding request and RDMA have completed.

The current I/O field acts as a shared memory communication vehicle between the consumer within a guest, and the Hypervisor. Specifically, when the Hypervisor desires a memory region swap out, it updates the quiesce indicator in the current I/O field (via an atomic instruction, for example) to state that the guest should quiesce outgoing I/O's against that memory region i.e. no further operations are initiated or executed. If the count is zero when the quiesce indicator is set, then the Hypervisor is free to begin the swap-out processing immediately, because the consumer within the guest has promised that it will not initiate I/O's while this indicator is set. The consumer made this promise by indicating its support of this advanced function when the consumer registered the memory region. If the count is non-zero, then the Hypervisor must wait until the consumer within the guest explicitly issues a "memory region quiesced" service to the Hypervisor, when the last outstanding I/O completes.

As stated above, the guest must not generate new I/O requests against a memory region while the quiesce indicator is set. Instead they may queue the requests and inform the Hypervisor of their interest in initiating new I/O's against that memory region. If no such interest is registered, the Hypervisor can leave the associated memory region swapped out for a long duration with no ill effect. Depending upon the interface provided, the consumer within the guest is either directly activated, or passively polls the quiesce indicator, to be informed of when it can resume the initiation of the queued I/O requests accessing the memory region.

When there are no outstanding I/O operations, the Hypervisor sets the valid bit in the protection table entry to indicate that the address translation table that defines the memory region is not valid. From an HCA perspective, this effectively temporarily de-registers the memory region, although the Address Translation Tables are retained (i.e. the L__Key/R__Key remains reserved so that nobody else can re-use this protection table entry). After this bit is set to not valid, the HCA prevents any accesses to this region, giving a protection check, should any device erroneously try to access it (just as it would if the region was not registered). Hence the consumer's promise of not initiating new I/O's becomes strictly enforced by the HCA hardware.

Once the memory region has been placed in this state (protection table entry not valid), the Hypervisor is free to swap out any of the pages that make up the memory region, and reuse the associated real memory. This design assumes that the protection table and address translation tables remain intact. This significantly reduces the complexities/overheads associated with the temporary swap out processing done by the Hypervisor. Given that protection table and address translation tables consume relatively fewer pages, this should not be a significant loss in function.

When the Hypervisor reactivates the memory region, the characteristics of the region, as defined in the protection table entry must remain the same, although the entries in the Address Translation Tables may need to be modified to reflect the new locations of the pages that make up the region. For example, the Hypervisor may determine the new addresses of the pages of the new location of the memory region and write these new values into the address translation table.

After the Address Translation Tables have been updated, the Hypervisor sets the Protection Table Entry valid bit back to the valid state (without changing any other values in this entry). Finally the Hypervisor resets the quiesce indicator within the memory region I/O count field, and optionally reactivates a pending guest consumer. Consumer initiated I/O operations that access this memory region may then resume.

This design assumes that the memory window implementation uses the identical control structure as the original memory regions. That is, the memory window has its own protection table entry that references the memory region's protection table entry to which the window is bound.

When a memory window is accessed, the HCA checks that the region to which it is bound is still valid by checking this same valid bit. When this is combined with the invention described above, i.e. the protection and address translation tables remain intact across a swap out, no additional action is required by either the Hypervisor or the HCA to support swapping out memory regions that contain memory windows. The existing protection checks prevent memory window access to swapped out memory regions.

Figure 13:
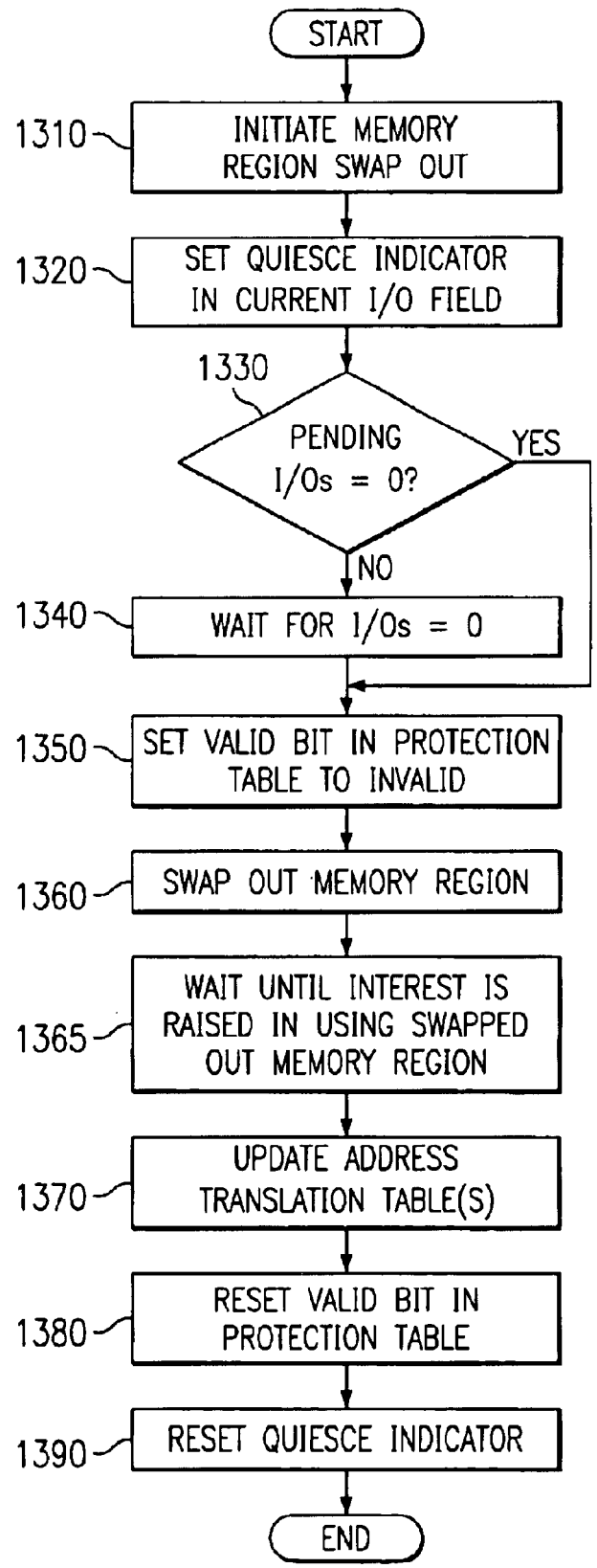
FIG. 13 is a flowchart outlining an exemplary operation for swaping out a memory region according to the present invention.

FIG. 13 is a flowchart outlining an exemplary operation of the present invention when swapping out a memory region. As shown in FIG. 13, the operation starts with the initiation of a memory swap out (step 1310). The arbitrator, e.g., Hypervisor, sets a quiesce indicator in a current I/O field associated with the memory region to be swapped out (step 1320). A determination is made as to whether the count of pending I/O's in the current I/O field is zero (step 1330). If so, the operation goes to step 1350.

If the count of pending I/O's in the current I/O field is not zero, the operation waits until the count is zero (step 1340). Once the count is zero, the valid bit for the memory region in the protection table is set to indicate that the memory region is invalid (step 1350). Thereafter, the memory region is swapped out (step 1360).

Once the memory region is swapped out, the Hypervisor can use the swapped out memory to benefit other consumers until interest in the swapped out memory region is raised by the owning guest (step 1365). At that time the address translation tables are updated to reflect any new locations of memory pages that make up the memory region (step 1370). Thereafter, the valid bit in the protection table for this memory region is reset to indicate the memory region as being valid (step 1380). The quiesce indicator in the current I/O field is then reset (step 1390) so that I/Os to the memory region may again commence. The operation then ends.

Thus, the present invention provides a mechanism by which swapping out of memory regions may be performed in a system area network. The present invention provides guarantees that I/O operations will not be made to a memory region that is being swapped out. These guarantees are enforced by hardware in the system area network.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of swapping out a memory region in a system area network, comprising:

instructing a process to inhibit further operations to the memory region;

determining if a current number of outstanding operations to the memory region is zero; and swapping out the memory region if the current number of outstanding operations to the memory region is zero, wherein the step of swapping out of the memory region is performed while inhibiting further operations to the memory region.

2. The method of claim 1, wherein instructing the process to inhibit further operations to the memory region includes setting a quiescent indicator for the memory region.

3. The method of claim 2, wherein the quiescent indicator is located in a fixed memory in association with the memory region.

4. The method of claim 2, wherein the quiescent indicator is located in fixed memory in association with a current outstanding operation count for the memory region.

5. The method of claim 4, wherein determining if a current number of outstanding operations to the memory region is zero includes determining if the current outstanding operation count is zero.

6. The method of claim 1, wherein swapping out the memory region includes setting a valid bit in a protection table entry associated with the memory region to indicate the memory region is invalid.

7. The method of claim 1, wherein swapping out the memory region includes deregistering the memory region.

8. The method of claim 1, further comprising:

swapping in the memory region;

updating an address translation table based on the swapping in of the memory region.

9. The method of claim 2, further comprising:

swapping in the memory region; and resetting the quiescent indicator to allow further operations to the memory region.

10. The method of claim 6, further comprising:

swapping in the memory region; and resetting the valid bit to indicate the memory region is valid.

11. A computer program product in a computer readable medium for swapping out a memory region in a system area network, comprising:

first instructions for instructing a process to inhibit further operations to the memory region;

second instructions for determining if a current number of outstanding operations to the memory region is zero; and third instructions for swapping out the memory region if the current number of outstanding operations to the memory region is zero, wherein the step of swapping out of the memory region is performed while inhibiting further operations to the memory region.

12. The computer program product of claim 11, wherein the first instructions for instructing the process to inhibit further operations to the memory region include instructions for setting a quiescent indicator for the memory region.

13. The computer program product of claim 12, wherein the quiescent indicator is located in a fixed memory in association with the memory region.

14. The computer program product of claim 12, wherein the quiescent indicator is located in fixed memory in association with a current outstanding operation count for the memory region.

15. The computer program product of claim 14, wherein the second instructions for determining if a current number of outstanding operations to the memory region is zero include instructions for determining if the currant outstanding operation count is zero.

16. The computer program product of claim 11, wherein the third instructions for swapping out the memory region include instructions for setting a valid bit in a protection table entry associated with the memory region to indicate the memory region is invalid.

17. The computer program product of claim 11, wherein the third instructions for swapping out the memory region include instructions for deregistering the memory region.

18. The computer program product of claim 11, further comprising:
   fourth instructions for swapping in the memory region;
   fifth instructions for updating an address translation table based on the swapping in of the memory region.

19. The computer program product of claim 12, further comprising:
   fourth instructions for swapping in the memory region; and
   fifth instructions for resetting the quiescent indicator to allow further operations to the memory region.

20. The computer program product of claim 16, further comprising:
   fourth instructions for swapping in the memory region; and
   fifth instructions for resetting the valid bit to indicate the memory region is valid.

21. An apparatus for swapping out a memory region in a system area network, comprising:
   means for instructing a process to inhibit further operations to the memory region;
   means for determining if a current number of outstanding operations to the memory region is zero; and
   means for swapping out the memory region if the current number of outstanding operations to the memory region is zero, wherein the step of swapping out of the memory region is preformed while inhibiting further operations to the memory region.

22. The apparatus of claim 21, wherein the means for instructing the process to inhibit further operations to the memory region includes means for setting a quiescent indicator for the memory region.

23. The apparatus of claim 22, wherein the quiescent indicator is located in a fixed memory in association with the memory region.

24. The apparatus of claim 22, wherein the quiescent indicator is located in fixed memory in association with a current outstanding operation count for the memory region.

25. The apparatus of claim 24, wherein the means for determining if a current number of outstanding operations to the memory region is zero includes means for determining if the current outstanding operation count is zero.

26. The apparatus of claim 21, wherein the means for swapping out the memory region includes means for setting a valid bit in a protection table entry associated with the memory region to indicate the memory region is invalid.

27. The apparatus of claim 21, wherein the means fur swapping out the memory region includes means for deregistering the memory region.

28. The apparatus of claim 21, further comprising:
   means fur swapping in the memory region;
   means for updating an address translation table based on the swapping in of the memory region.

29. The apparatus of claim 22, further comprising:
   means for swapping in the memory region; and
   means for resetting the quiescent indicator to allow further operations to the memory region.

30. The apparatus of claim 26, further comprising:
   means for swapping in the memory region; and
   means for resetting the valid bit to indicate the memory region is valid.

* * * * *

UNITED STATES PATENT AND TRADEMARK OFFICE
CERTIFICATE OF CORRECTION

PATENT NO. : 6,834,332 B2  Page 1 of 1
DATED : December 21, 2004
INVENTOR(S) : Craddock et al.

It is certified that error appears in the above-identified patent and that said Letters Patent is hereby corrected as shown below:

Column 15,
Line 61, after "Ser. No." delete "09/758,188" and insert -- 09/758,788 --.

Column 22,
Line 23, after "means" delete "fur" and insert -- for --.

Signed and Sealed this

Eleventh Day of April, 2006

JON W. DUDAS
*Director of the United States Patent and Trademark Office*